(12) United States Patent
Smith et al.

(10) Patent No.: US 9,522,730 B2
(45) Date of Patent: *Dec. 20, 2016

(54) AUTOROTATIVE ENHANCEMENT SYSTEM

(71) Applicant: Bell Helicopter Textron Inc., Fort Worth, TX (US)

(72) Inventors: Dudley E. Smith, Arlington, TX (US); Cory M. Hitte, Fort Worth, TX (US); Bryan Marshall, Mansfield, TX (US); Carlos Alexander Fenny, Arlington, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/934,477

(22) Filed: Nov. 6, 2015

(65) Prior Publication Data

US 2016/0059957 A1 Mar. 3, 2016

Related U.S. Application Data

(63) Continuation of application No. 13/834,215, filed on Mar. 15, 2013, now Pat. No. 9,180,964.

(51) Int. Cl.
*B64C 27/12* (2006.01)
*B64D 27/24* (2006.01)
*B64C 27/00* (2006.01)
*B64D 27/02* (2006.01)

(52) U.S. Cl.
CPC ............. *B64C 27/006* (2013.01); *B64C 27/12* (2013.01); *B64D 27/24* (2013.01); *B64D 2027/026* (2013.01); *Y10T 29/49117* (2015.01)

(58) Field of Classification Search
CPC ...... B64C 27/006; B64C 27/025; B64C 27/12; B64C 2201/042; B64C 27/24; B64C 2027/026
See application file for complete search history.

(56) References Cited

U.S. PATENT DOCUMENTS

| | | | |
|---|---|---|---|
| 3,027,704 | A | 4/1962 | Dmitroff |
| 3,260,313 | A | 7/1966 | Reuther |
| 3,352,255 | A | 1/1968 | De Rocca et al. |

(Continued)

FOREIGN PATENT DOCUMENTS

| | | |
|---|---|---|
| DE | 102008014404 | 10/2009 |
| EP | 1247736 | 10/2002 |

(Continued)

OTHER PUBLICATIONS

PriusChat, "Comparing the Prius v. Honda hybrid idle-stop feature," Nov. 2007 http://priuschat.com/threads/comparing-the-prius-v-honda-hybrid-idle-stop-feature.39401/.*

(Continued)

*Primary Examiner* — Joseph W Sanderson

(57) ABSTRACT

Embodiments refer generally to systems and methods for providing autorotative enhancement for helicopters using an autorotative assist unit coupled to the transmission of the helicopter. Methods of utilizing an autorotative assist unit as well as retrofitting an autorotative assist unit to an existing helicopter are also disclosed. By employing an autorotative assist unit, improved autorotation can be achieved without the need to increase the weight of the rotor.

12 Claims, 9 Drawing Sheets

(56) References Cited

U.S. PATENT DOCUMENTS

| | | | |
|---|---|---|---|
| 3,362,255 A * | 1/1968 | De Rocca | B64C 27/12 192/47 |
| 3,455,182 A | 7/1969 | Kelley | |
| 4,046,335 A | 9/1977 | Osberger | |
| 4,609,165 A | 9/1986 | Logan et al. | |
| 5,100,080 A | 3/1992 | Servanty | |
| 8,464,980 B2 | 6/2013 | Certain | |
| 8,469,306 B2 | 6/2013 | Kuhn, Jr. | |
| 8,727,271 B2 | 5/2014 | Salyer | |
| 9,180,964 B2 * | 11/2015 | Smith | B64C 27/006 |
| 2002/0145076 A1 | 10/2002 | Alford | |
| 2009/0113871 A1 | 5/2009 | Certain | |
| 2009/0145998 A1 | 6/2009 | Salyer | |
| 2009/0320460 A1 | 12/2009 | Peterson | |
| 2010/0013223 A1 * | 1/2010 | Certain | B60K 6/24 290/31 |
| 2011/0024555 A1 | 2/2011 | Kuhn, Jr. | |
| 2011/0121127 A1 | 5/2011 | Certain | |
| 2012/0025032 A1 | 2/2012 | Hopdjanian et al. | |
| 2013/0134253 A1 | 5/2013 | Carter | |
| 2013/0134264 A1 | 5/2013 | Carter et al. | |
| 2014/0034781 A1 | 1/2014 | Liu et al. | |
| 2014/0346283 A1 | 11/2014 | Salyer | |

FOREIGN PATENT DOCUMENTS

| | | |
|---|---|---|
| EP | 2327625 | 6/2011 |
| EP | 2703292 | 8/2013 |
| GB | 1219457 | 1/1971 |

OTHER PUBLICATIONS

European Search Report issued in European Application No. 13171571.6 on Oct. 17, 2013; 3 pages.
Communication Pursuant to Article 94(3) EPC issued in European Application No. 13171571.6 on Oct. 30, 2013; 5 pages.
Communication Pursuant to Article 94(3) EPC issued in European Application No. 13171571.6 on Dec. 1, 2014; 4 pages.
European Search Report issued in European Application No. 15194261.2 on Feb. 5, 2016; 3 pages.
Communication Pursuant to Article 94(3) EPC issued in European Application No. 15194261.2 on Feb. 18, 2016; 6 pages.

* cited by examiner

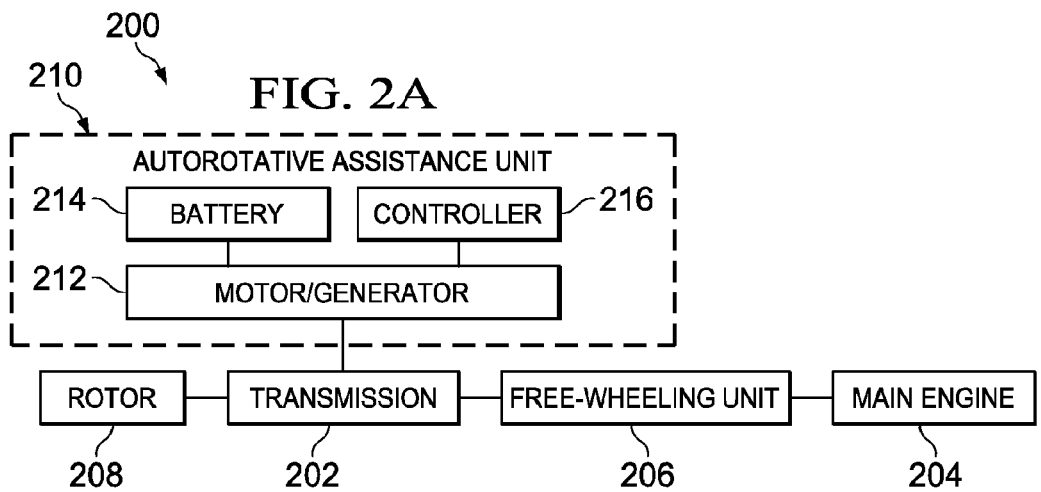
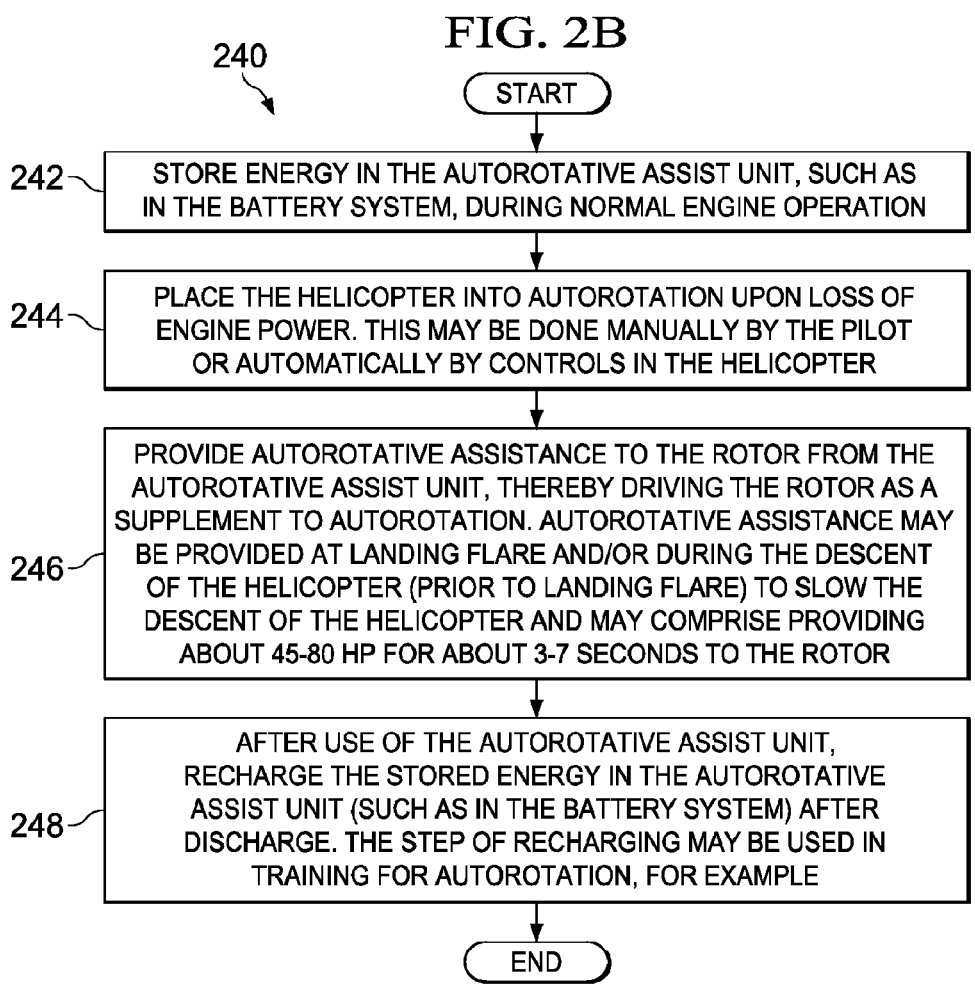

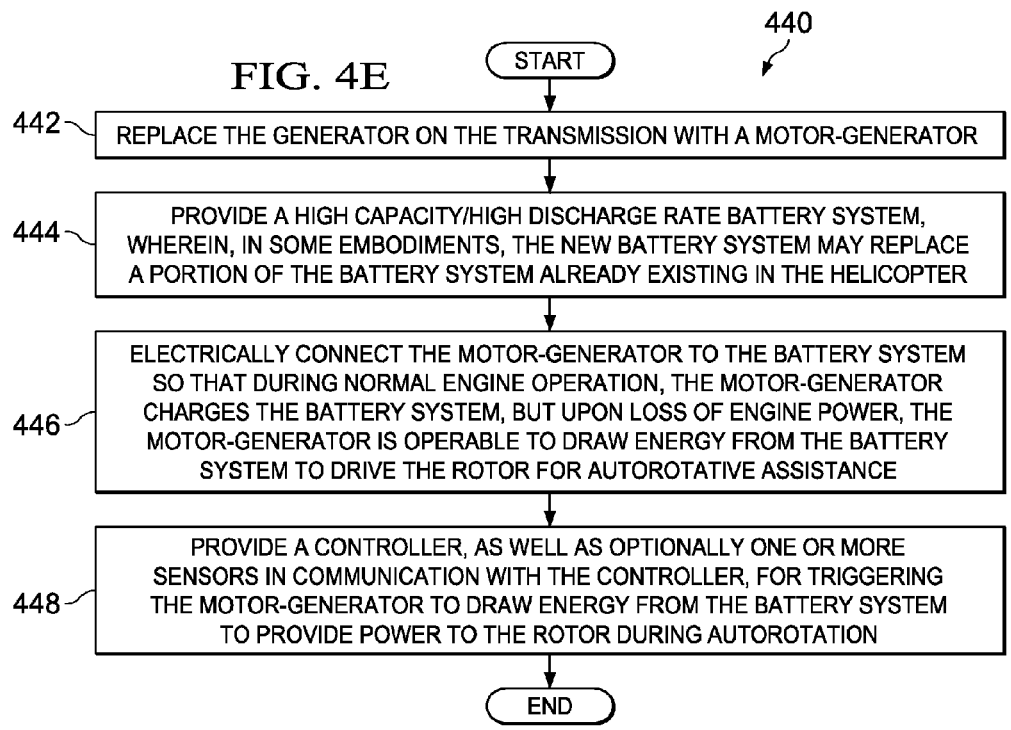
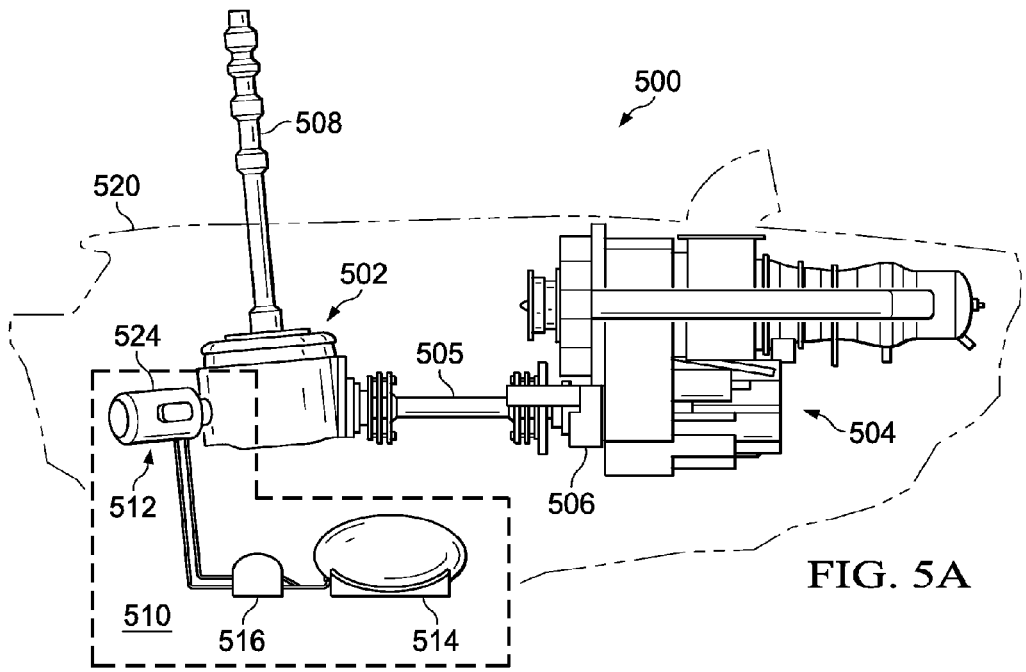

AUTOROTATIVE ENHANCEMENT SYSTEM

CROSS-REFERENCE TO RELATED APPLICATIONS

This application is a continuation of and claims priority to U.S. application Ser. No. 13/834,215, filed Mar. 15, 2013, the entire contents of which is hereby incorporated by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In the event of engine failure, a helicopter can employ autorotation to execute a safe landing, wherein the main rotor system of the helicopter is turned by the action of air moving up through the rotor. This generates lift and drag to slow the descent of the helicopter. Autorotation can allow the helicopter to descend and land safely without the use of the main engine. Autorotation can be particularly useful for single engine helicopters.

SUMMARY

In some embodiments of the disclosure, an autorotative assist system for a rotor helicopter is disclosed as comprising a transmission coupled to the rotor, an engine coupled to the transmission (via a drive shaft with a freewheeling unit allowing for free rotation of the rotor upon loss of engine power), and an autorotative assist unit couple to the transmission (typically independent of the engine primary drive system (e.g. drive shaft and/or free-wheeling unit) and/or without any intervening component or gearing such as the freewheeling unit), wherein the autorotative assist unit is operable to store energy during normal engine operation, and the autorotative assist unit is operable to drive the rotor through the transmission to provide supplemental autorotative assistance upon loss of engine power (e.g. when the engine rpm level falls below the rpm level of the rotor).

In other embodiments of the disclosure, a method of providing autorotative assistance for a rotor helicopter having an autorotative assist unit is provided that comprises, upon loss of engine power, placing the helicopter into autorotation, and providing autorotative assistance to the rotor from the autorotative assist unit (thereby driving the rotor as a supplement to autorotation).

In yet other embodiments of the disclosure, a method is disclosed for retrofitting a helicopter for improved autorotation capabilities, wherein the helicopter includes a rotor, a transmission having a generator off the transmission housing, and an engine, the method comprising replacing the generator on the transmission with a motor-generator, providing a high capacity/high discharge rate battery system, and electrically connecting the motor-generator to the battery system so that, during normal engine operation, the motor-generator charges the battery system, but upon loss of engine power, the motor-generator is operable to draw energy from the battery system to drive the rotor for autorotative assistance.

BRIEF DESCRIPTION OF THE DRAWINGS

For a more complete understanding of the present disclosure and the advantages thereof, reference is now made to the following brief description, taken in connection with the accompanying drawings and detailed description:

FIG. 2A is a schematic illustration of an autorotative assist unit according to an embodiment of the disclosure;

FIG. 2B is a flowchart illustrating a method of providing autorotative assistance for a rotor helicopter;

FIG. 4E is a flowchart illustrating a method of retrofitting a helicopter for improved autorotation capabilities;

FIG. 5A is a side view of yet another system including the transmission, engine and rotor of a helicopter comprising an autorotative assist unit, shown within the helicopter;

DETAILED DESCRIPTION

It should be understood at the outset that although an illustrative implementation of one or more embodiments are provided below, the disclosed systems and/or methods can be implemented using any number of techniques, whether currently known or in existence. The disclosure should in no way be limited to the illustrative implementations, drawings, and techniques illustrated below, including the exemplary designs and implementations illustrated and described herein, but can be modified within the scope of the appended claims along with their full scope of equivalents.

In some cases, it can be desirable to provide enhancement or assistance to the autorotation of a helicopter in the event of engine failure. An autorotative assist unit can be operable to enhance the safety of the descent and landing of a helicopter using autorotation. The autorotative assist unit can provide supplemental power to the rotor system of a helicopter during autorotation, such as a landing flare of energy operable to slow descent of a helicopter right before landing, for example. A landing flare can be used to execute a safe landing during autorotation. Design criteria for helicopters can require the ability to complete autorotation from a certain density altitude, such as around 7,000 feet, for example. To meet the criteria, an autorotative assist unit can be used to enhance the autorotative capabilities of the helicopter.

Figure 1:
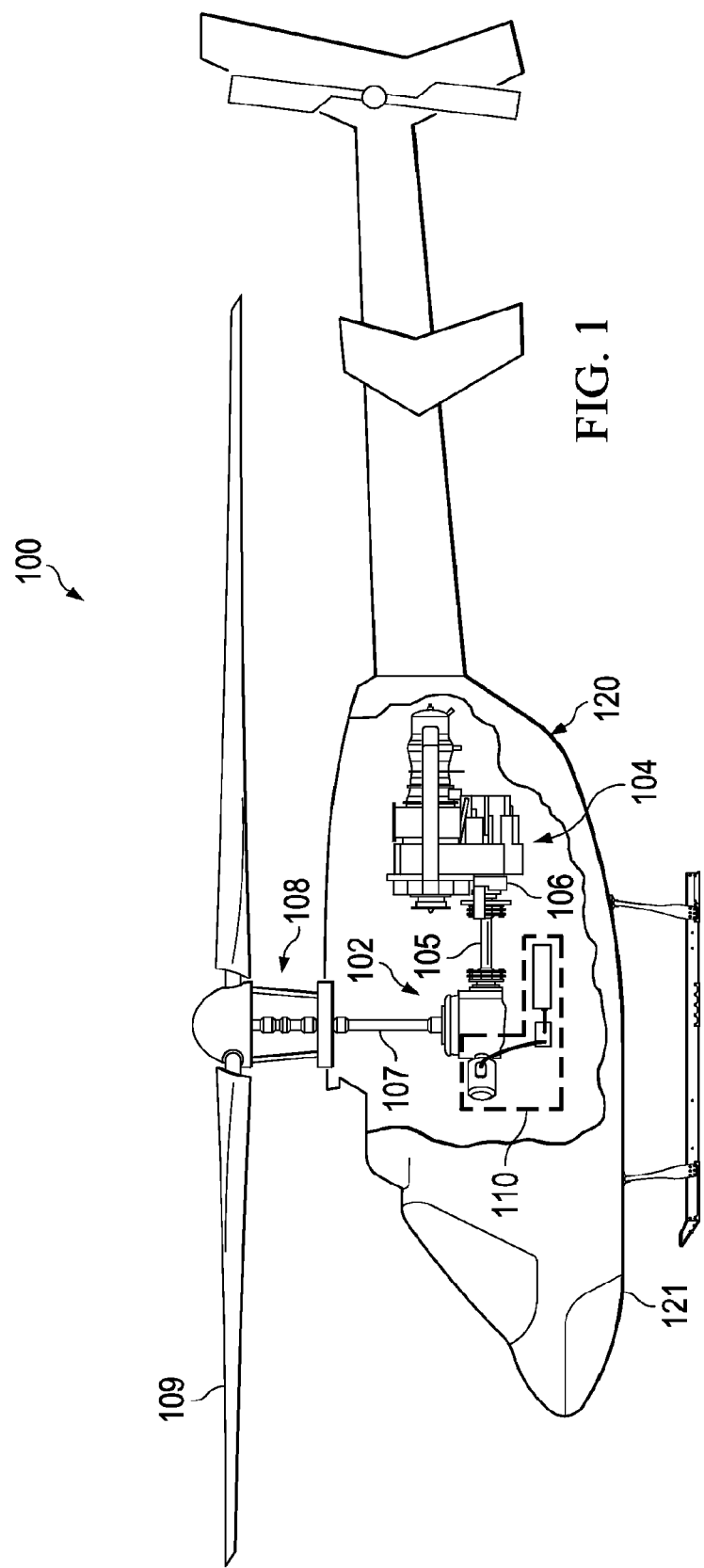
FIG. 1 illustrates a helicopter comprising an autorotative assist unit according to an embodiment of the disclosure.
Figure 3A:
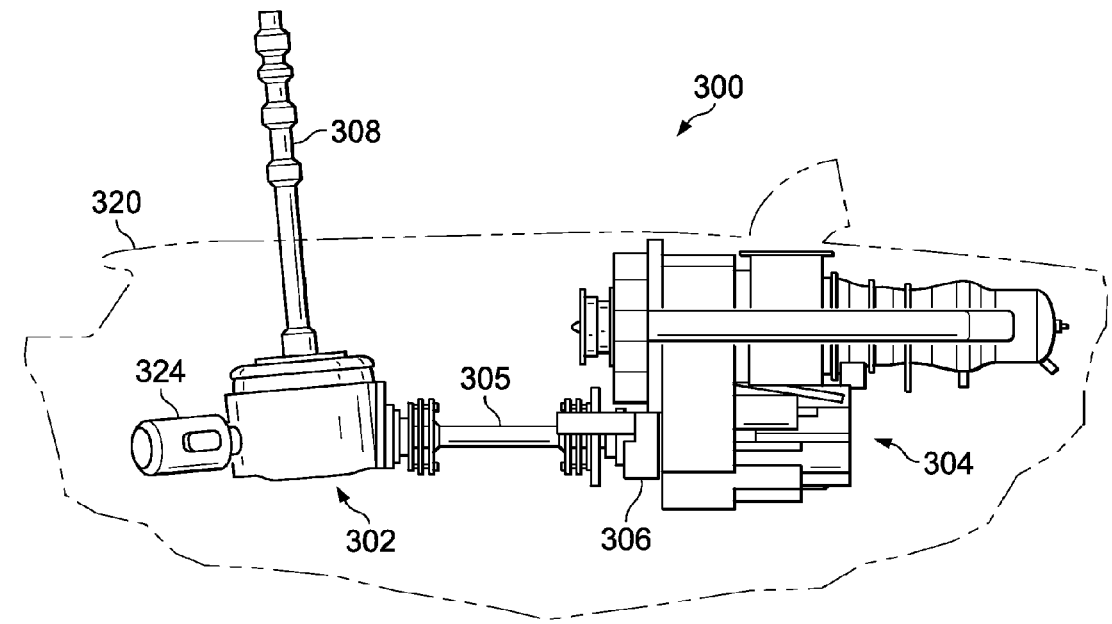
FIG. 3A is a side view of a system including the transmission, engine and rotor of a helicopter without an autorotative assist unit, shown within the helicopter.
Figure 3B:
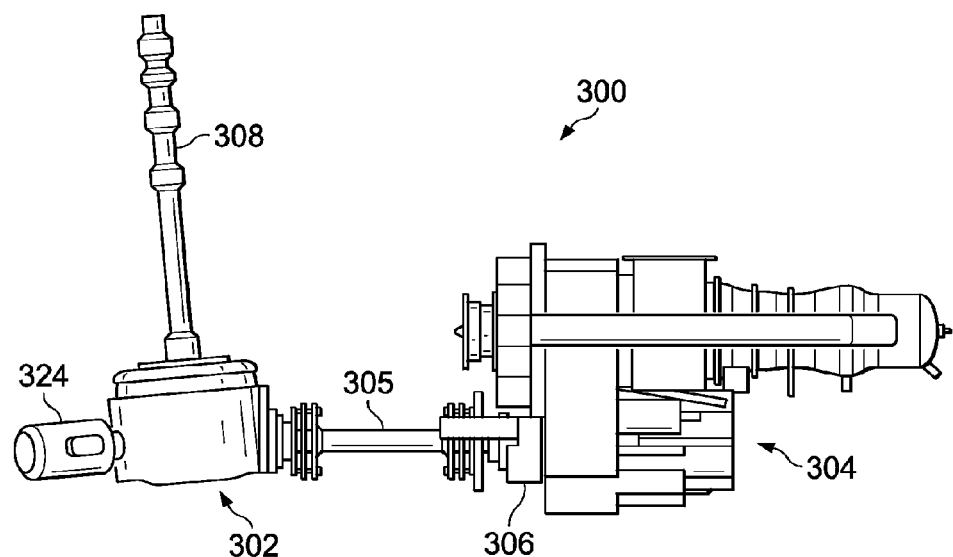
FIG. 3B is a side view of a system including the transmission, engine and rotor of a helicopter without an autorotative assist unit.
Figure 3C:
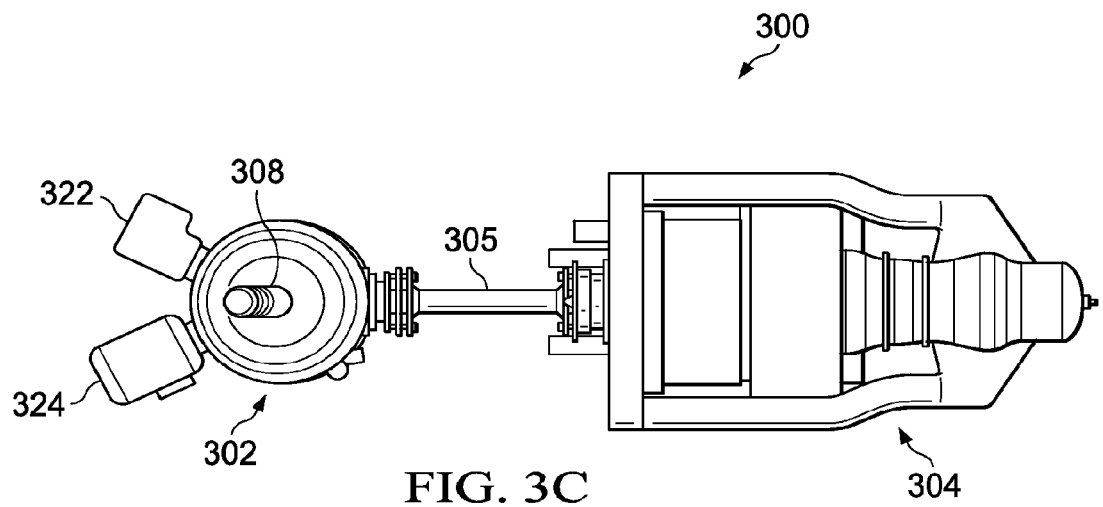
FIG. 3C is a top view of a system including the transmission, engine and rotor of a helicopter without an autorotative assist unit.
Figure 3D:
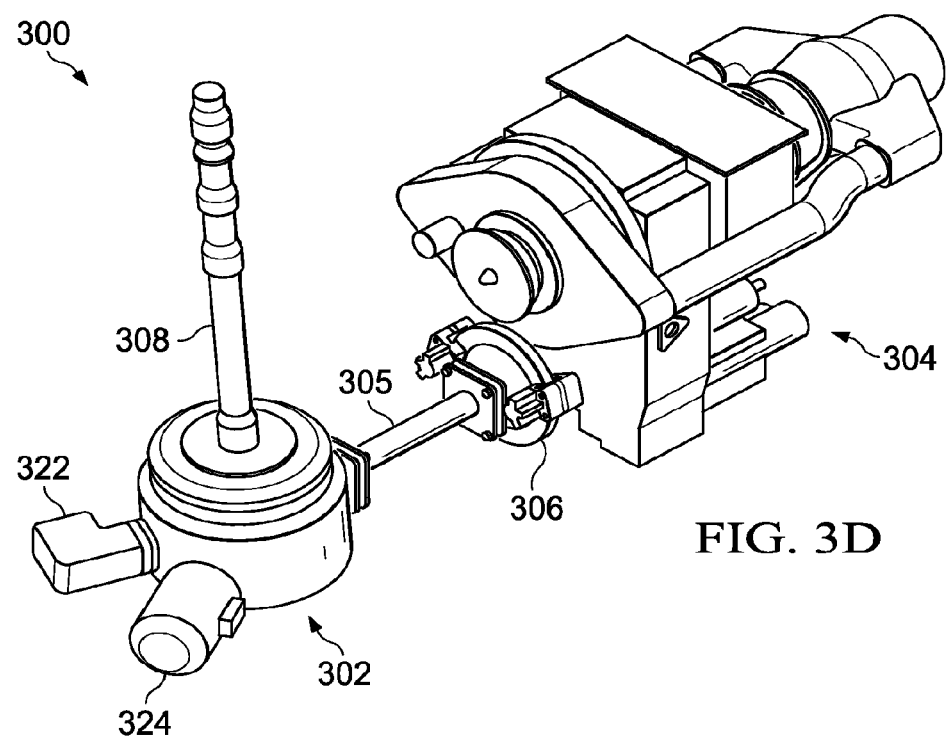
FIG. 3D is an perspective view of a system including the transmission, engine and rotor of a helicopter without an autorotative assist unit.
Figure 4A:
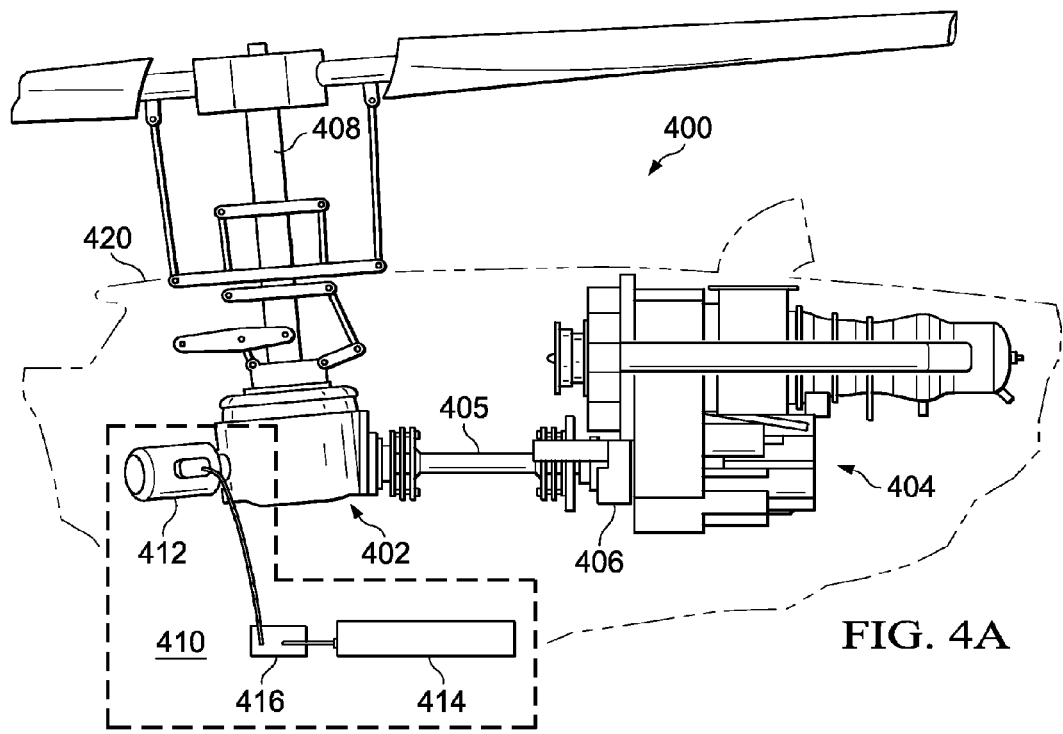
FIG. 4A is a side view of another system including the transmission, engine and rotor of a helicopter comprising an autorotative assist unit, shown within the helicopter.
Figure 4B:
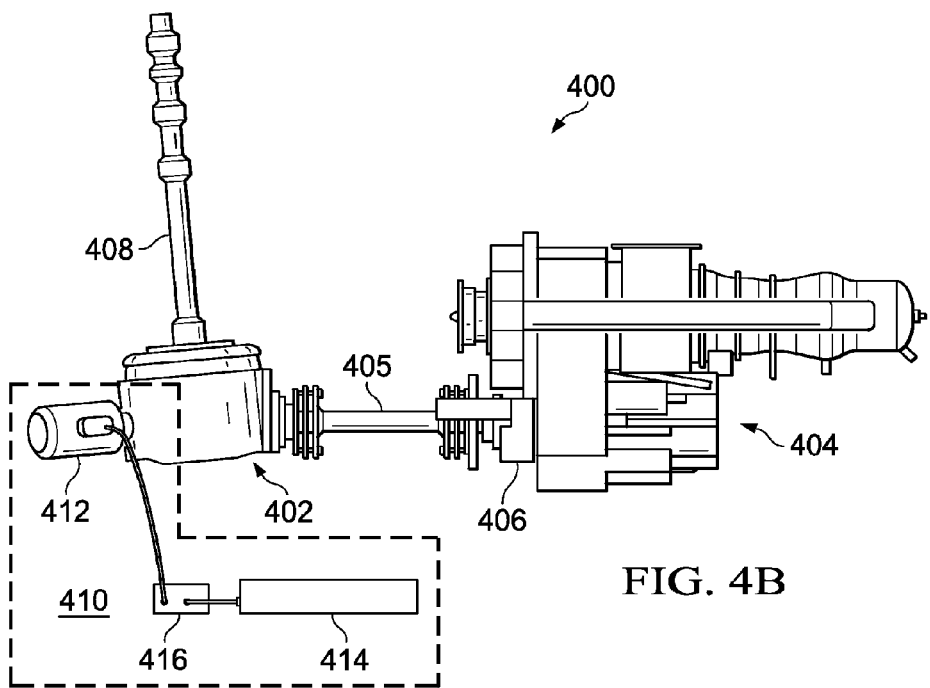
FIG. 4B is a side view of a system including the transmission, engine and rotor of a helicopter comprising an autorotative assist unit.
Figure 4C:
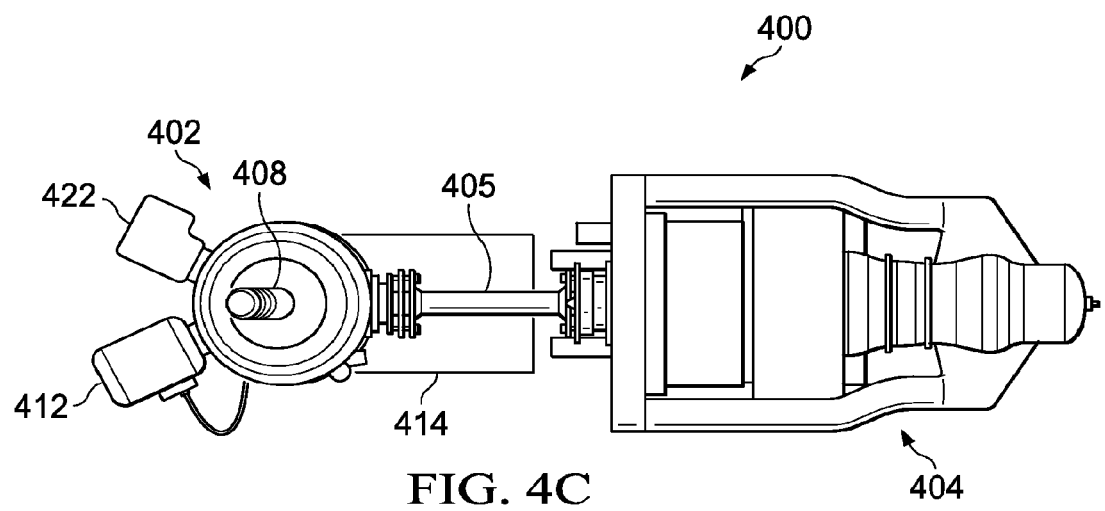
FIG. 4C is a top view of a system including the transmission, engine and rotor of a helicopter comprising an autorotative assist unit.
Figure 4D:
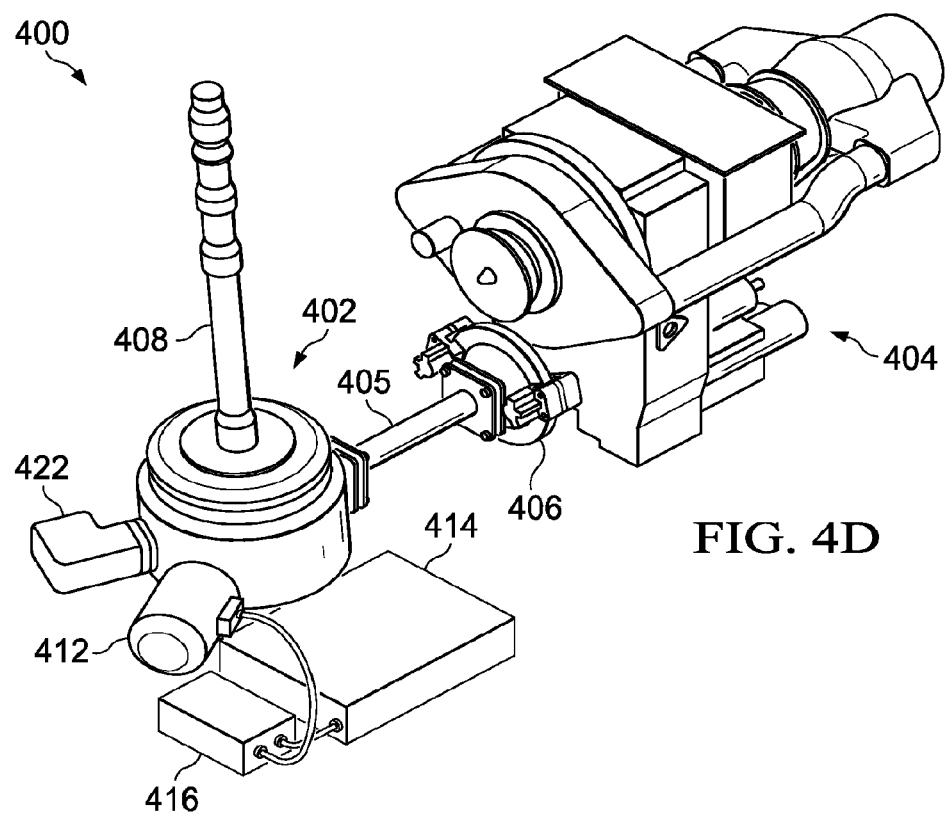
FIG. 4D is an perspective view of a system including the transmission, engine and rotor of a helicopter comprising an autorotative assist unit.

Referring to FIG. 1, a system 100 according to an embodiment of the disclosure is shown. The system 100 comprises a helicopter 120, wherein the helicopter 120 comprises a fuselage 121, a transmission 102, an engine 104 mechanically coupled to the transmission 102, a rotor system 108 mechanically coupled to the transmission 102, and an autorotative assist unit 110 mechanically coupled to the transmission 102. The rotor system 108 can comprise a mast 107 coupled to the transmission 102 and rotor blades 109 coupled to the mast 107. The transmission 102 can be coupled to the engine 104 via a drive shaft 105 and/or a freewheeling unit 106, wherein the freewheeling unit 106 allows for free rotation of the rotor 108 upon loss of power from the engine 104 (such can be needed to allow autorotation). The engine 104 can comprise a turbine or piston engine, for example, and the helicopter 120 can be a single engine helicopter or a multi-engine helicopter. In one embodiment, the helicopter 120 can comprise a single engine helicopter with a rotor 108. The autorotative assist unit 110 is not typically used during normal engine operation (e.g. climb, cruise, hover, descent, etc.). Instead, the autorotative assist unit 110 can be operable to store energy (for example, excess engine energy not required to drive the rotor 108) during normal engine operation. In the event of failure of the engine 104, the freewheeling unit 106 can disengage the transmission 102 from the engine 104, and the autorotative assist unit 110 can be operable to provide power to the transmission 102 and therefore the rotor 108 (as a supplement to normal autorotation). The autorotative assist unit can be applicable to all rotor hub types, but it can be particularly helpful in helicopters with articulated or low inertia rotors.

During autorotation, a pilot of the helicopter 120 can control the energy output from the autorotative assist unit 110 to the rotor 108, for example, deciding when to use the supplemental power from the autorotative assist unit 110 and/or how much of the available autorotative assist unit 110 power to use. The flight crew can be provided with an indication of the amount of energy stored in the autorotative assist unit 110. For example, the output of energy can be controlled automatically by the autorotative assist unit 110. In another example, a "landing flare" of energy from the autorotative assist unit 110 can be used to slow the descent of the helicopter 120 right before landing. In a further example, energy from the autorotative assist unit 110 can be used to slow the helicopter 120 throughout the descent and/or at the landing. Additionally, the energy input from the autorotative assist unit 110 can be used to stop descent, hover, level cruise, or possibly lift the helicopter 120 if necessary (for example, to traverse an obstacle). Several different methods can be used to input the energy from the autorotative assist unit 110 to the rotor 108 based on the conditions of the descent and landing and the abilities and decisions of the pilot of the helicopter 120.

In some embodiments, the autorotative assist unit 110 can respond to sensor input from sensors within the helicopter 120 to automatically provide autorotative assistance. Sensors can provide information comprising engine revolutions per minute (rpm), rotor rpm, descent rate, and/or altitude, as well as energy stored in the autorotative assist unit 110. For example, the autorotative assist unit 110 can be triggered to provide autorotative assistance when the rpm level of the engine 104 falls below the rpm level of the rotor 108. Autorotative assistance can also be controlled by a model or function executed by a controller coupled to the autorotative assist unit 110.

In some embodiments, the autorotative assist unit 110 can comprise an electric motor-generator, a battery system electrically coupled to the motor-generator operable to store and discharge energy, and a controller operable to control autorotative assist by communicating commands from a pilot and/or receiving sensor data. In another embodiment, the autorotative assist unit 110 can comprise a hydraulic pump-motor, a hydraulic accumulator in fluid communication with the hydraulic pump-motor operable to store and discharge energy, and a controller operable to control release of the energy stored in the hydraulic accumulator. In yet another embodiment, the autorotative assist unit 110 can comprise a mechanical power storage system, such as a flywheel or spring arrangement, for example.

Referring now to FIG. 2A, a schematic illustration of an autorotative assist system 200 is shown, according to an embodiment of the disclosure. The autorotative assist system 200 can comprise a transmission 202, an engine 204 mechanically coupled to the transmission 202 via a freewheeling unit 206, a rotor 208 mechanically coupled to the transmission 202, and an autorotative assist unit 210 mechanically coupled to the transmission 202 (typically without any intermediate gearing). In some embodiments, the autorotative assist unit 210 can comprise a motor-generator 212 mechanically coupled to the transmission 202, a battery system 214 electrically coupled to the motor-generator 212, and a controller 216 for operating the motor-generator 212. In such embodiments, the battery system 214 can comprise a high capacity/high discharge rate battery system, such as a Lithium (Li) ion battery for example. The battery system 214 can be operable to store energy during normal operation of the engine 204 and discharge this energy for autorotative assistance. By having a high discharge rate, the battery system 214 can allow for a boost of power for autorotative assistance. A high capacity/high discharge rate battery system 214 can be operable to recover energy in a short period of time, which can enable repeated autorotative assistance, such as can be used during a training exercise, for example.

The controller 216 can be operable to communicate commands to the motor-generator 212 for directing the stored power in the battery system 214 of the autorotative assist unit 210 to power the motor-generator 212 to drive the rotor 208. For example, the controller 216 can receive commands from a pilot of the helicopter, for example. In another example, the controller 216 can receive sensor input and, based on the sensor input, can automatically trigger the motor-generator 212 to provide autorotative assistance. Additionally, a combination of automatic and manual control of the autorotative assist unit 210 can be provided by the controller 216. In some embodiments, the energy input to the rotor 208 can be spread out during the descent and/or the energy can be used during the landing flare. This control of the energy output can be scheduled by the controller 216, it can be triggered by a pilot, or a combination of the two can be used. For example, the autorotative assist unit 210 can automatically put the helicopter in an autorotative state when the engine 204 fails, and the energy remaining after doing so can be used at the discretion of the pilot. In some embodiments, the autorotative assist unit 210 can be operable to provide about 80 hp for about 6-7 seconds. In other embodiments, the autorotative assist unit 210 can be operable to provide about 45 hp for about 3-4 seconds. In yet other embodiments, the autorotative assist unit 210 can be operable to provide about 45-80 hp for about 3-7 seconds. In some embodiments, the autorotative assist unit 210 can weigh about 62-64 pounds. Typically, the weight of such an autorotative assist unit can be less than the additional weight that would have to be added to the rotor to achieve rotational inertia for comparable autorotation landing performance.

Some embodiments of the disclosure include methods 240, shown in FIG. 2B of providing autorotative assistance for a rotor helicopter, wherein the helicopter comprises an autorotative assist unit 210. The method 240 can comprise, at block 244, placing the helicopter into autorotation upon loss of engine power. This can be done manually by the pilot or automatically by controls in the helicopter. Then, when necessary, the method 240 can comprise, at block 246, providing autorotative assistance to the rotor 208 from the autorotative assist unit 210, thereby driving the rotor 208 as a supplement to autorotation. In some embodiments, the method 240 can also comprise, at block 242, storing energy in the autorotative assist unit 210, such as in the battery system 214, during normal engine operation (wherein the storing energy can precede the steps at blocks 244 and 246). Autorotative assistance can be triggered manually by pilot control and/or automatically based on sensor input, wherein the helicopter can comprise sensors operable to provide information to the autorotative assist unit 210, such as engine rpm, rotor rpm, speed, descent rate, and altitude, as well as energy stored in the battery system 214. In some embodiments, the autorotative assistance comprises providing about 45-80 hp for about 3-7 seconds to the rotor 208. Autorotative assistance can be provided at landing flare and/or during the descent of the helicopter (prior to landing flare) to slow the descent of the helicopter. In some embodiments, the method 240 can further comprise, at block 248, after use of the autorotative assist unit 210, recharging the stored energy in the autorotative assist unit 210 (such as in the battery system 214) after discharge. The step of recharging can be used in training for autorotation, for example.

Referring now to FIGS. 3A-3D, different views of a rotor drive system 300 that does not comprise an autorotative assist unit are shown. The transmission 302 can be coupled to the rotor 308 (or mast of the rotor system) and to the engine 304 via a drive shaft 305 and a free-wheeling unit 306. The free-wheeling unit 306 can be operable to disengage the engine 304 from the transmission 302 upon engine failure to allow for autorotation. The transmission 302 can also be coupled to a hydraulic pump system 322 and an electric generator 324. The hydraulic pump system 322 and electric generator 324 can couple to the transmission 302 independently of the drive shaft 305 or the free-wheeling unit 306.

Referring now to FIGS. 4A-4D, a detailed view of a system 400 comprising an electrically-based autorotative assist unit 410 is shown. Similarly to the system 300 shown in FIGS. 3A-3D, the transmission 402 is coupled to the engine 404, via a drive shaft 405 and a free-wheeling unit 406, and to the rotor 408 (or mast of the rotor system). The transmission 402 can also be coupled to a hydraulic pump system 422 and an autorotative assist unit 410. The autorotative assist unit 410 can comprise a motor-generator 412, a battery system 414 and a controller 416. In some embodiments, the motor-generator 412 of the autorotative assist unit 410 can take the place of an electric generator 324 (as shown in FIGS. 3A-3D).

Some embodiments of the disclosure can include methods, as shown in FIG. 4E of retrofitting a helicopter for improved autorotation capabilities, wherein the helicopter 420 comprises a rotor 408, a transmission 402 having a generator 324 (as shown in FIGS. 3A-3D) off the transmission housing 402, and an engine 404. The method 440 can comprise, at block 442, replacing the generator 324 on the transmission 402 with a motor-generator 412. Then, at block 444, the method can comprise providing a high capacity/high discharge rate battery system 414, wherein, in some embodiments, the new battery system 414 can replace a portion of the battery system already existing in the helicopter 420. The method can then comprise, at block 446, electrically connecting the motor-generator 412 to the battery system 414 so that during normal engine operation, the motor-generator 412 charges the battery system 414, but upon loss of engine power, the motor-generator 412 is operable to draw energy from the battery system 414 to drive the rotor 408 for autorotative assistance. Additionally, the transmission 402 can couple to a free-wheeling unit 406, and the motor-generator 412 and the engine 404 can be coupled to the transmission 402 on opposite sides of the freewheeling unit 406. In other words, the motor-generator 412 can be coupled to the transmission 402 independently of a drive shaft 405 (and/or free-wheeling unit 406) from the engine 404. Typically, the motor-generator 412 can be coupled to the transmission without any intervening components, such as gearing. The method can additionally comprise, at block 448, providing a controller 416, as well as optionally one or more sensors in communication with the controller 416, for triggering the motor-generator 412 to draw energy from the battery system 414 to provide power to the rotor 408 during autorotation. In some embodiments, the motor-generator 412 and battery system 414 can be operable to provide about 45-80 hp to the rotor 408 for about 3-7 seconds during autorotation. Additionally, the motor-generator 412 and battery system 414 can weigh no more than about 65 pounds, for example about 60-65 pounds, in some embodiments.

Referring now to FIGS. 5A-5D, a detailed view of a system 500 comprising a hydraulically-based autorotative assist unit 510 is shown. Similarly to the system 300 shown in FIGS. 3A-3D, the transmission 502 is coupled to the engine 504, via a drive shaft 505 and a free-wheeling unit 506, and to the rotor 508 (or mast of the rotor system). The transmission 502 can also be coupled to an electric generator 524 and an autorotative assist unit 510. The autorotative assist unit 510 can comprise a hydraulic pump-motor 512, a hydraulic accumulator 514 and a controller 516. In some embodiments, hydraulic pump-motor 512 of the autorotative assist unit 510 can take the place of a hydraulic pump system 322 (as shown in FIGS. 3A-3D). Although not specifically shown, it should be understood that the AAU in some embodiments can comprises both electrical and hydraulic features.

Figure 5B:
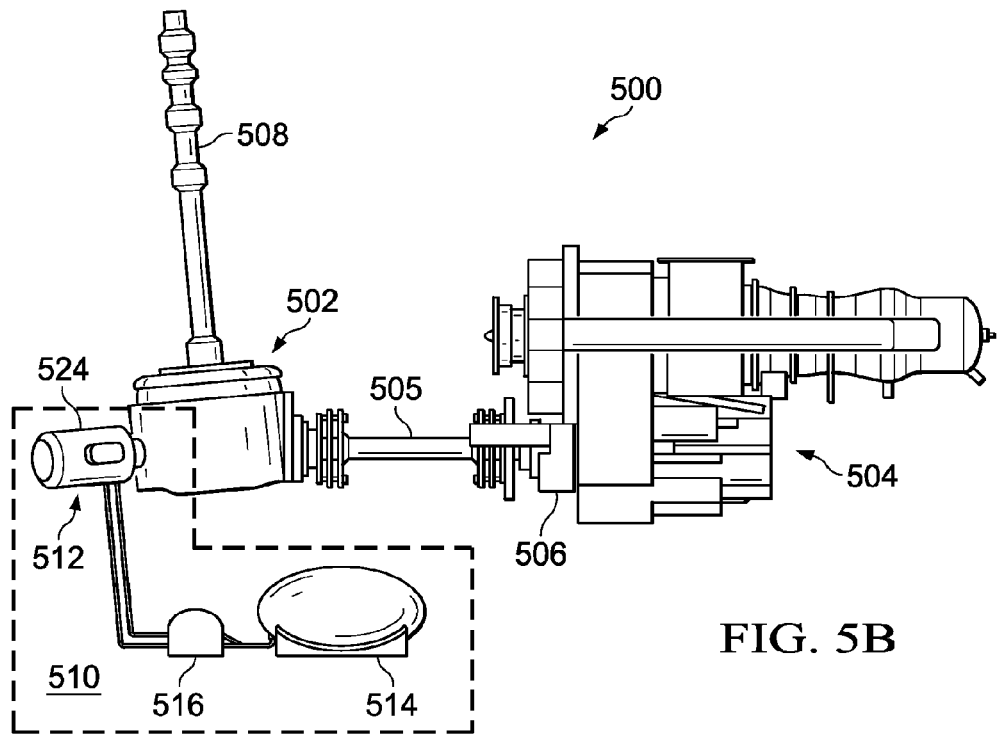
FIG. 5B is a side view of a system including the transmission, engine and rotor of a helicopter comprising an autorotative assist unit.
Figure 5C:
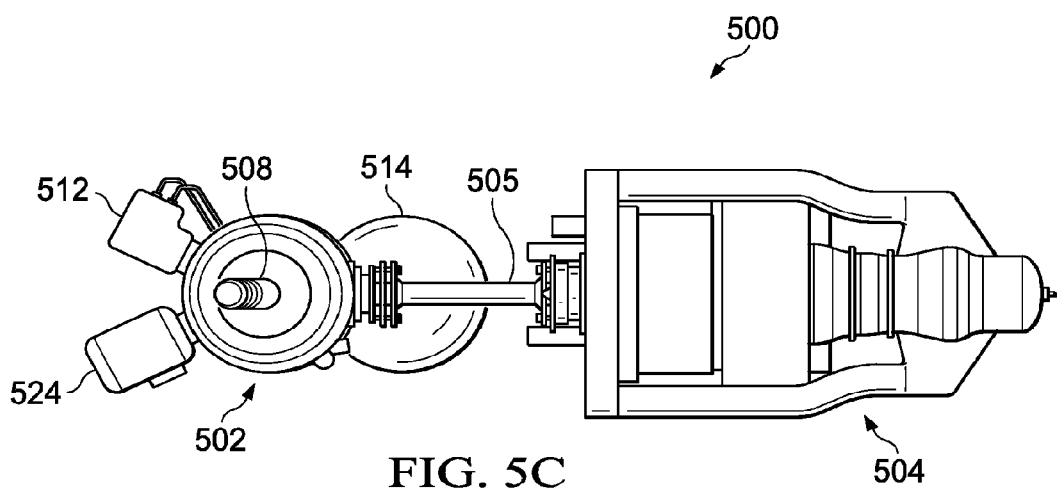
FIG. 5C is a top view of a system including the transmission, engine and rotor of a helicopter comprising an autorotative assist unit.
Figure 5D:
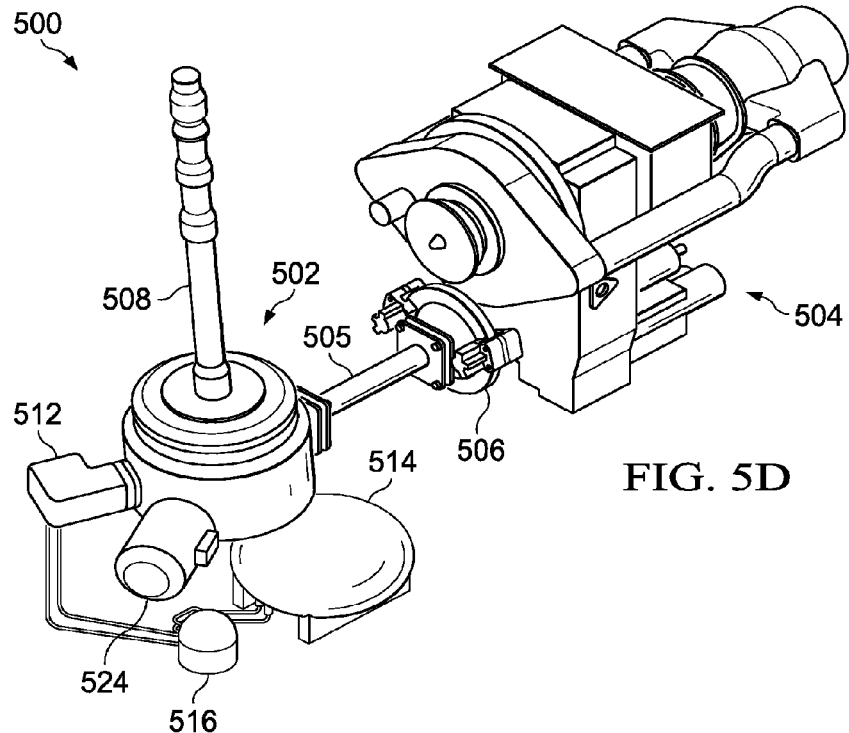
FIG. 5D is an perspective view of a system including the transmission, engine and rotor of a helicopter comprising an autorotative assist unit.
Figure 5E:
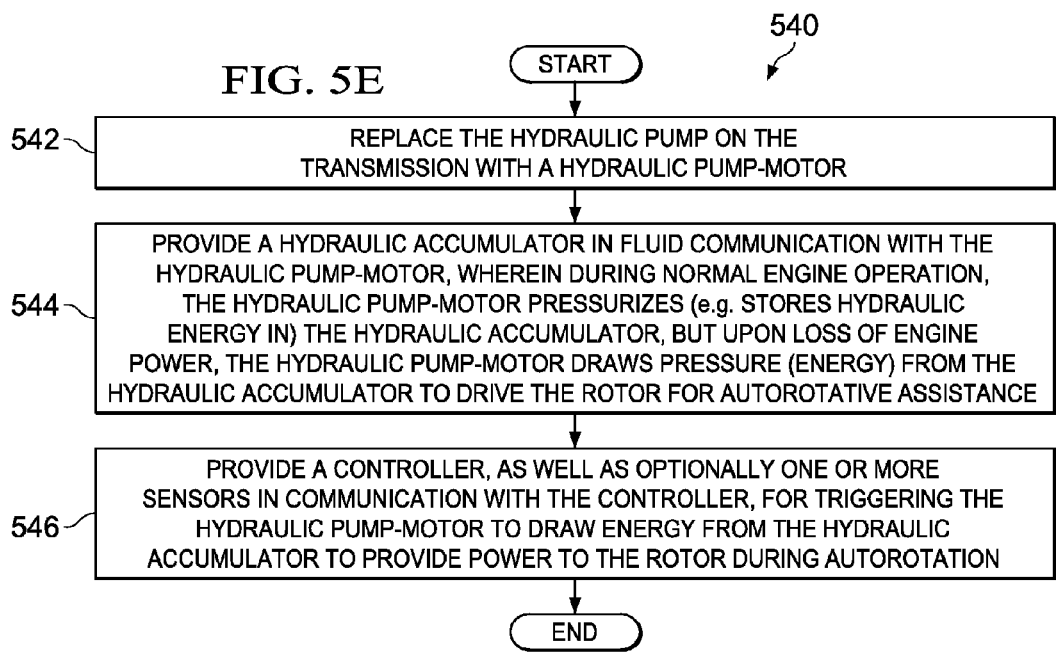
FIG. 5E is a flowchart illustrating another method of retrofitting a helicopter for improved autorotation capabilities.

Some embodiments of the disclosure can include methods, shown in FIG. 5E, of retrofitting a helicopter for improved autorotation capabilities, wherein the helicopter comprises a rotor 508, a transmission 502 having a hydraulic pump 322 (as shown in FIGS. 3A-3D) off the transmission housing 502, and an engine 504. The method 540 can comprise, at block 542, replacing the hydraulic pump 322 on the transmission 502 with a hydraulic pump-motor 512. Then, at block 544, the method can comprise providing a hydraulic accumulator 514 in fluid communication with the hydraulic pump-motor 512, wherein during normal engine operation, the hydraulic pump-motor 512 pressurizes (e.g. stores hydraulic energy in) the hydraulic accumulator 514, but upon loss of engine power, the hydraulic pump-motor 512 draws pressure (energy) from the hydraulic accumulator 514 to drive the rotor for autorotative assistance. In some embodiments, the hydraulic accumulator 514 can comprise a pressure vessel. Additionally, the transmission 502 can couple to a free-wheeling unit 506 and the hydraulic pump-motor 512 and the engine 504 can be coupled to the transmission 502 on opposite sides of the freewheeling unit 506. In other words, the hydraulic pump-motor 512 can be coupled to the transmission 502 independently of a drive shaft 505 from the engine 504. Typically, the pump-motor can be coupled to the transmission without any intervening components, such as gearing. The method can additionally comprise, at block 546, providing a controller 516, as well as optionally one or more sensors in communication with the controller 516, for triggering the hydraulic pump-motor 512 to draw energy from the hydraulic accumulator 514 to provide power to the rotor 508 during autorotation. In some embodiments, the hydraulic pump-motor 512 and hydraulic accumulator 514 can be operable to provide about 45-80 hp to the rotor 508 for about 3-7 seconds during autorotation. Additionally, the hydraulic pump-motor 512 and hydraulic accumulator 514 can weigh less than about 65 pounds, for example about 60-65 pounds, in some embodiments.

As has been described above and shown in the figures, certain embodiments of the disclosure include a shim that is used to bond a component to a bearing. The shim can have an elastic modulus value that is lower than an elastic modulus value of the component being bonded to the bearing. In such a case, as torsional strain is applied to the component, the shim absorbs a portion of the torsional strain. This reduces an amount of torsional strain experienced by an adhesive layer. Accordingly, since the amount of torsional strain in the adhesive layer is reduced, the adhesive layer can be less likely to fail during operation and can require less maintenance. Additionally, the use of a shim can be advantageous in that it can replace custom molded bearings and components, which can have long lead times and be difficult to assemble and replace.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A method of providing autorotative assistance, the method comprising:
    during normal operation of an engine driving a transmission to rotate rotor blades:
        converting energy from the transmission into electrical energy using a motor-generator coupled to the transmission, and
        storing the energy in an energy storage unit coupled to the motor-generator, and upon loss of engine power, providing stored energy from the energy storage unit to the motor-generator, and
        operating the motor-generator using the stored energy to drive the rotor blades through the transmission to provide supplemental autorotative assistance.

2. The method of claim 1, further comprising directing the stored energy in the energy storage unit to the motor-generator or the hydraulic pump-motor to drive the rotor.

3. The method of claim 1, further comprising, during normal operation, operating the motor-generator as a generator to provide supplemental electric power to the transmission.

4. The method of claim 1, further comprising, upon loss of engine power, controlling the supplemental autorotative assistance provided using a controller connected to the motor-generator and the energy storage unit.

5. The method of claim 1, wherein the motor-generator and battery system are configured to provide about 80 hp for about 6-7 seconds.

6. The method of claim 1, wherein the motor-generator and battery system are operable to provide about 45 hp for about 3-4 seconds.

7. A method of providing autorotative assistance, the method comprising:
    upon loss of engine power of an engine driving a transmission to rotate rotor blades:
        providing energy from an energy storage unit to a motor-generator coupled to the transmission, wherein, before loss of the engine power and during normal operation of the engine, the motor-generator converted energy from the transmission into electrical energy using the motor-generator and the energy storage unit stored the energy; and
        providing supplemental autorotative assistance to drive the rotor blades through the transmission by operating the motor-generator using the stored energy to drive the rotor blades.

8. The method of claim 7, further comprising directing the stored energy in the energy storage unit to the motor-generator or the hydraulic pump-motor to drive the rotor.

9. The method of claim 7, further comprising, during normal operation, operating the motor-generator as a generator to provide supplemental electric power to the transmission.

10. The method of claim 7, further comprising, upon loss of engine power, controlling the supplemental autorotative assistance provided using a controller connected to the motor-generator and the energy storage unit.

11. The method of claim 7, wherein the motor-generator and battery system are configured to provide about 80 hp for about 6-7 seconds.

12. The method of claim 7, wherein the motor-generator and battery system are operable to provide about 45 hp for about 3-4 seconds.

* * * * *